No. 851,971. PATENTED APR. 30, 1907.
J. L. AHLERS.
COMBINED MILK AND CREAM PASTEURIZER AND COOLER.
APPLICATION FILED APR. 30, 1906.

3 SHEETS—SHEET 1.

Witnesses:
C. C. Holly
J. Townsend

Inventor
Joachim Lewis Ahlers.
By James R. Townsend
his Atty.

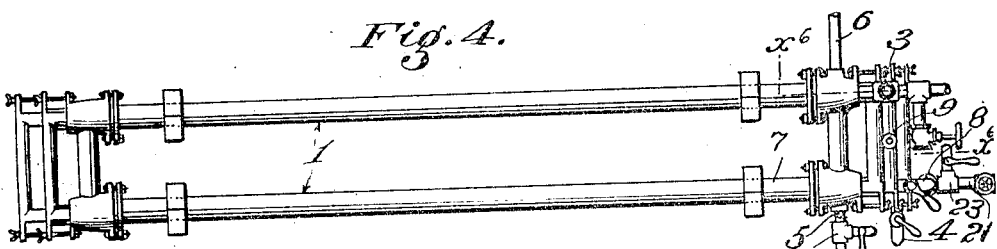
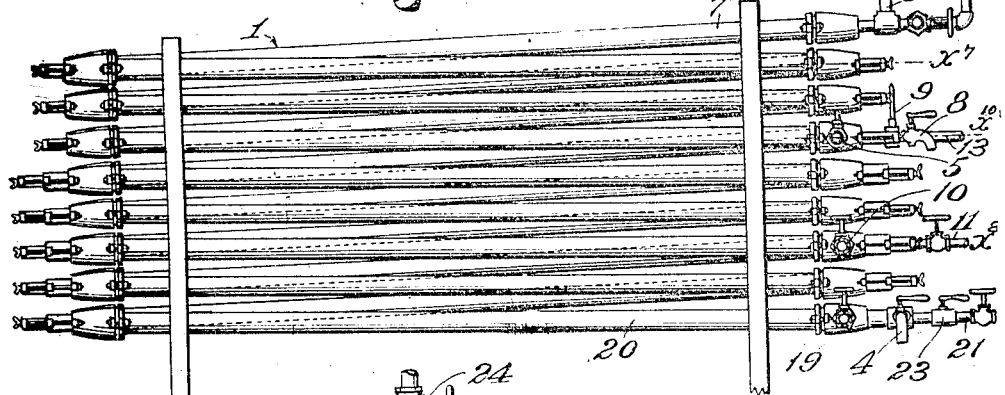
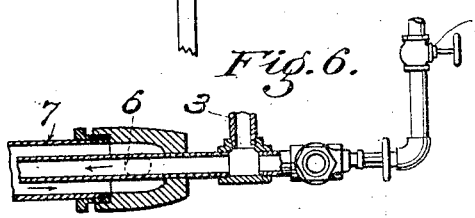
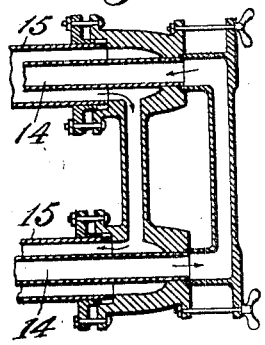
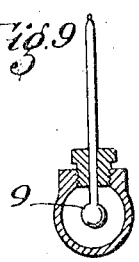
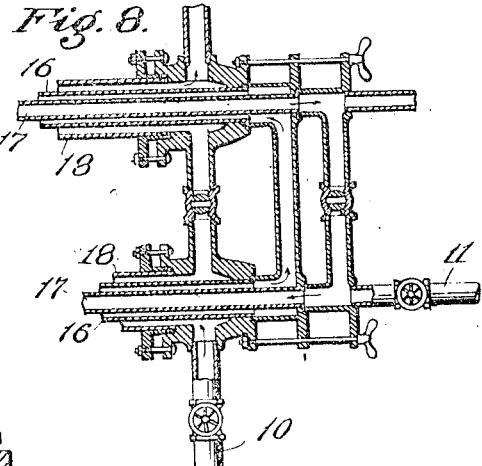

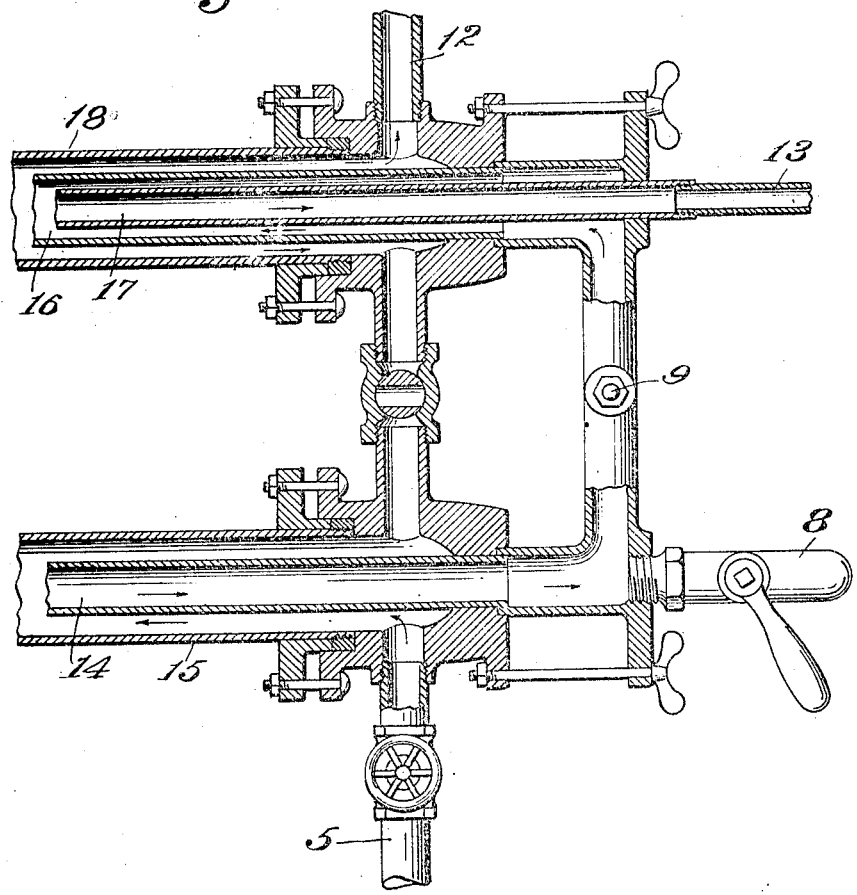

UNITED STATES PATENT OFFICE.

JOACHIM LEWIS AHLERS, OF SANTA ANA, CALIFORNIA.

COMBINED MILK AND CREAM PASTEURIZER AND COOLER.

No. 851,971.   Specification of Letters Patent.   Patented April 30, 1907.

Application filed April 30, 1906. Serial No. 314,387.

*To all whom it may concern:*

Be it known that I, JOACHIM LEWIS AHLERS, a citizen of the United States, residing at Santa Ana, in the county of Orange and State of California, have invented a new and useful Combined Milk and Cream Pasteurizer and Cooler, of which the following is a specification.

It is of the objects of this invention to provide superior means for treating milk and cream to destroy the germs and prevent fermentation, and to maintain the milk and cream in a sweet condition for the maximum time at a minimum cost and expense of time and labor. This I accomplish by providing a combined pasteurizer and cooler which heats and cools the milk and cream on a gravity system with one continuous stream.

It is of the objects to provide simple apparatus for accomplishing the foregoing objects, and to provide for readily and thoroughly cleansing the same at a minimum cost and expense of time and labor.

The apparatus may be constructed in various forms and of various sizes and capacities.

The accompanying drawings illustrate the invention in the form I at present deem most satisfactory, and having a capacity of twenty-five hundred pounds of milk or twelve hundred pounds of cream per hour.

Figure 1:
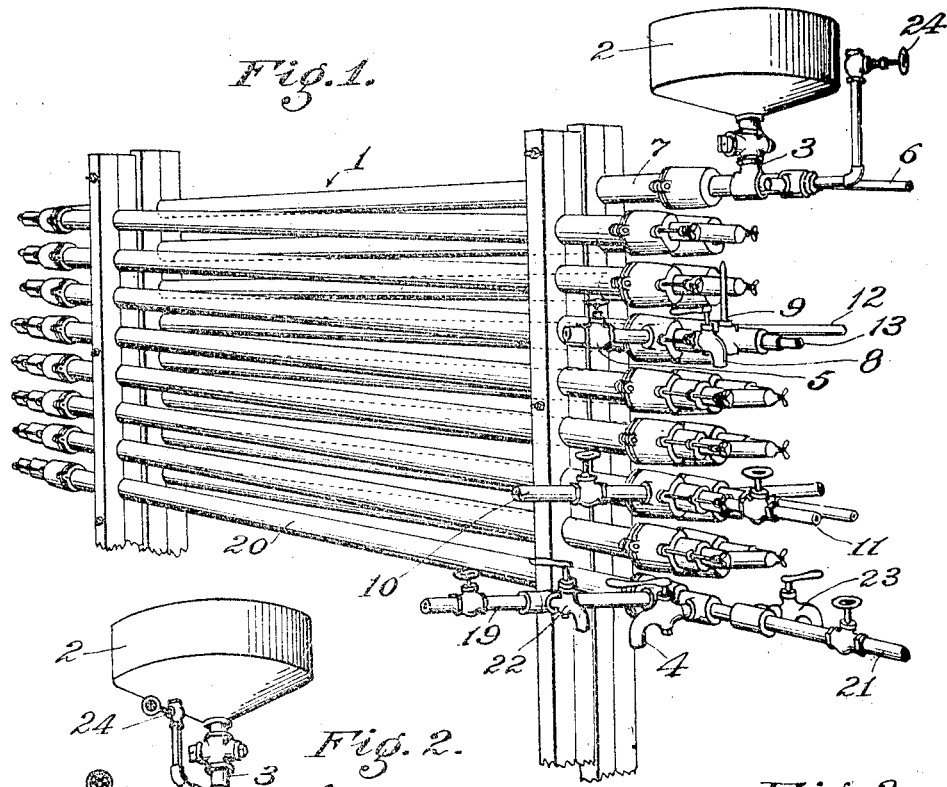
Figure 2:
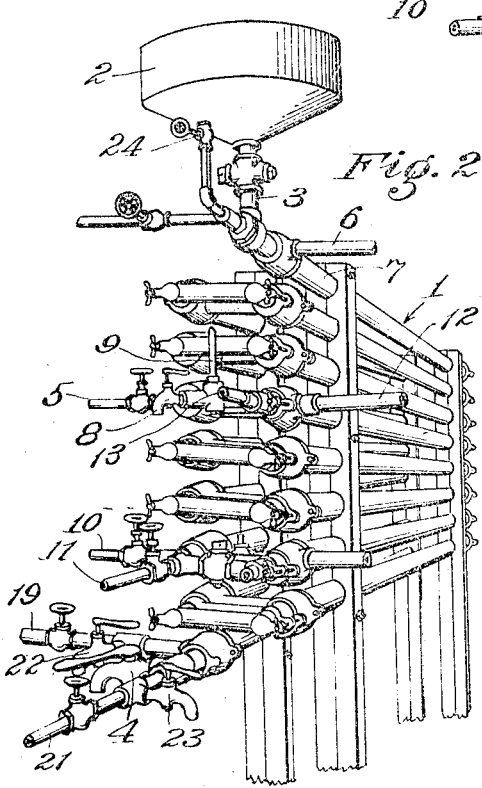
Figure 3:
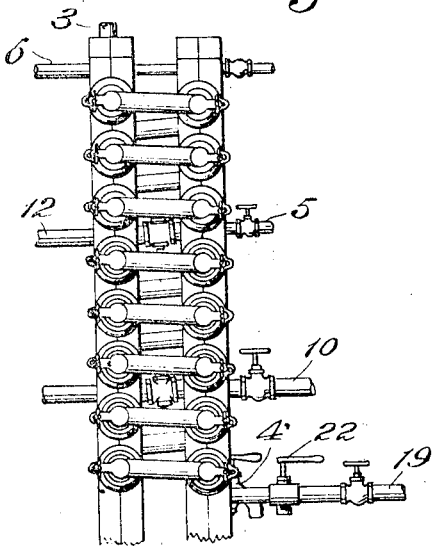

Figures 1 and 2 are perspective views of one end of the apparatus taken from opposite sides. Fig. 3 is an elevation of the end of the apparatus opposite to that shown in Figs. 1 and 2. Fig. 4 is a plan of the apparatus. Fig. 5 is a side elevation of the same. Fig. 6 is a fragmental, sectional detail showing the inlets for milk and for steam for cleansing purposes. Fig. 7 is a sectional detail illustrating the heating portion of the apparatus. Fig. 8 is a sectional detail illustrating the cooling portion of the apparatus. Fig. 9 is a sectional detail showing the application of a thermometer to the milk pipe at either the heating or cooling portions thereof. Fig. 10 is a fragmental, sectional detail of the apparatus showing the inlet for the heating medium and the outlet of the primary cooling medium.

The cooling device shown in Fig. 8 is duplicated in the preferred form of apparatus; one being used with water as the preliminary, and the other being used with ammonia, brine, ice-water, or other cooling medium for the final cooling.

In Figs. 1, 2, 3, 4, 5, supply and exhaust pipes are broken to contract the views.

Specific reference being had to the drawings, 1 represents a plurality of inclined pipes joined together at stated points. Means for forcing milk through the said pipes is provided: in the present instance this means consisting of a tank or vat 2 having an inlet 3, the outlet being shown at the terminating point of the flow of the milk at 4; this outlet, of course, being on a considerably lower level than that of the supply.

When the milk is admitted into the pipes, it proceeds in its course through the entire system of pipes until it reaches a point shown at 5, which is a valve provided for the admission of steam or hot water in a reverse direction from the travel of the milk through the said pipes, the said travel of steam terminating at outlet 6. Now in order to avoid the commingling of steam with the milk, I provide a pipe, practically a jacket 7, which jacket surrounds the milk conduit, and between the walls of which the steam is conveyed, thus heating the milk while in motion. A faucet 8 is provided for the purpose of taking out hot milk if desired, or for cleaning purposes, and a thermometer 9 is arranged to indicate the temperature of the milk. After the milk has coursed through the pipes to the steam inlet 5, the cooling process begins, water being admitted at 10 and 11, both water inlets having separate pipes to convey the water, the milk always lying between the two cooling surfaces. The water, like the steam, travels in a direction opposite to that of the milk, and escapes through an outlet 12 and 13.

To more clearly illustrate the operation of the travel of the milk and the cooling media, reference is had to Fig. 10 of the accompanying drawings, from which it will be seen that after the milk has been heated in the pipes 14 by the heating medium carried in the jacket 15 which surrounds the milk conduit, the milk proceeds in the direction of the arrow, passes the point where the thermometer is stationed, and enters the pipe 16, from which point on the cooling of the milk begins and continues until it is finally discharged from the tubes. As will be seen in said Fig. 10, the cooling media are carried by the tubes or pipes 17 and 18, the milk lying between the two cooling surfaces. Now in order to further cool the milk in its travel through the various tubes, I provide a conduit or pipe 19, which pipe is intended to convey brine, ice water, or any other effective cooling medium or chemical through the pipe 20 which is the outside jacket or pipe, and likewise a pipe 21 which is the center or internal pipe and conveys a similar cooling medium as the pipe 19; the milk in this instance, as in the other instance, lying between the two.

In order to drain the entire apparatus, faucets 22, 23, are opened, by reason of which all the water, brine, or condensed steam which may be in the pipes will be allowed to drain off, and in order to purify the pipes or cleanse them of whatever impurities may have collected during the operation, the valve 24 is opened, consequently permitting steam to pass through all of the pipes through which the milk has been circulated.

What I claim is:—

1. A pasteurizer comprising a plurality of pipes arranged to convey milk, cream, and other liquids, said pipes being arranged in an inclined plane whereby the flow is accelerated by gravity, a steam-conveying pipe surrounding said milk pipe, an inlet for said steam pipe, a cooling pipe within said milk pipe and a cooling pipe surrounding said milk pipe whereby the milk lies between two cooling surfaces, and an inlet for the cooling medium.

2. A pasteurizer comprising a plurality of tubes, said tubes being out of horizontal alinement with each other and arranged to convey milk by gravity, said tubes being contiguous with each other and having an inlet and an outlet; a pipe surrounding the milk pipe, a steam inlet for said pipe, cooling pipes surrounding the milk pipes, cooling pipes extending through the milk pipes, an inlet for said pipes, the steam inlet and water inlet being intermediate the inlet and outlet for the pipes, and means whereby the tubes may be drained.

3. A pasteurizer comprising a plurality of pipes arranged out of horizontal alinement and contiguous with each other whereby the milk fed from one end courses through said pipes by gravity to the outlet, a pipe surrounding said milk pipe, a steam inlet for said pipe for heating the milk while in its travel, the steam being injected in a direction opposite to that of the travel of the milk, an outlet for said steam, a cooling pipe surrounding said milk pipe, a cooling pipe within said milk pipe, an inlet for the cooling medium, said cooling pipe being arranged on a level lower than that of the steam inlet; an outlet for said cooling pipe, and means for draining the pipe.

4. A pasteurizer comprising a pipe composed of sections arranged out of horizontal alinement with each other, a pipe extending through a portion of said pipes, a steam inlet for said pipe for allowing the steam to be injected in a direction reverse to that of the travel of the milk, an outlet for the heated milk, an outlet for the heating medium, two pipes within the lower section of said pasteurizing pipe arranged to carry a cooling medium, the milk being forced to travel between said pipes whereby the cooling area of the adjacent surfaces of the pipes is increased, and an outlet for the cooling medium.

5. A pasteurizer comprising a plurality of pipes arranged to convey milk, cream, and other liquids, said pipes being arranged in an inclined plane whereby the flow is accelerated by gravity, removable headers on said pipes for cleansing said pipes of adhering impurities, a steam conveying pipe surrounding said milk pipe, an inlet for said steam pipe, a cooling pipe within said milk pipe, and a cooling pipe surrounding said milk pipe whereby the milk lies between two cooling surfaces, and an inlet for the cooling medium.

6. A pasteurizer comprising a plurality of pipes arranged to convey milk, cream, and other liquids, said pipes being arranged in an inclined plane whereby the flow is accelerated by gravity, a steam conveying pipe surrounding said milk pipe, an inlet for said steam pipe, a cooling pipe within said milk pipe, a cooling pipe surrounding said milk pipe whereby the milk lies between two cooling surfaces, and two inlets for cooling media, one being arranged on a lower level than the other.

In testimony whereof, I have hereunto set my hand at Los Angeles, California this 17th day of March 1906.

JOACHIM LEWIS AHLERS.

In presence of—
ANTON GLOETZNER, JR.,
JULIA TOWNSEND.